US 6,496,888 B1

(12) United States Patent
Pole, II

(10) Patent No.: US 6,496,888 B1
(45) Date of Patent: Dec. 17, 2002

(54) INCORPORATION OF BUS RATIO STRAP OPTIONS IN CHIPSET LOGIC

(75) Inventor: Edwin J. Pole, II, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/397,159

(22) Filed: Sep. 15, 1999

(51) Int. Cl.[7] ............................ G06F 1/32; G06F 13/00
(52) U.S. Cl. ....................................... 710/110; 713/300
(58) Field of Search .......................... 710/110; 713/300, 713/322, 321, 320

(56) References Cited

U.S. PATENT DOCUMENTS 5,666,550 A * 9/1997 Sulzbach ...................... 326/86
5,974,556 A * 10/1999 Jackson et al. ............. 327/509
6,101,319 A   8/2000 Hall ....................... 395/183.18

\* cited by examiner

Primary Examiner—Xuan M. Thai
(74) Attorney, Agent, or Firm—Peter Lam

(57) ABSTRACT

A method for incorporating bus ratio strap options in chipset logic. The method of one embodiment first fabricates a register and multiplexer in chipset logic. The register is programmed with a bus ratio setting. A bus ratio setting is selected to be the output from the multiplexer. The selected bus ratio setting is driven out from the multiplexer to output pins.

26 Claims, 5 Drawing Sheets

US 6,496,888 B1

INCORPORATION OF BUS RATIO STRAP OPTIONS IN CHIPSET LOGIC

FIELD OF THE INVENTION

This invention relates to the field of computers and computer systems. More particularly, the present invention relates to a method and apparatus for incorporating bus ratio strap options in chipset logic.

BACKGROUND OF THE INVENTION

In recent years, the price of personal computers (PCs) have rapidly declined. As a result, more and more consumers have been able to take advantage of newer and faster machines. One of the fast growing sectors of the computer industry involves mobile computing. Users in both the business and home markets are now purchasing notebook computers for use on the road. Unlike desktop computers that are powered by an alternating current (AC) source, notebook computers usually run off a battery supply. If a mobile computer is operating at the same performance level as a desktop machine, the power is drained relatively quickly.

In order to extend battery life of mobile computers without widening the performance gap with desktop counterparts, computer manufacturers and designers have instituted power saving technology. One attempt to reduce power consumption entails the use of low power circuit devices. Another power saving method is to use software in controlling system power and shutting down system devices that are not needed.

Another power saving technique is the use of dual-mode mobile processor technology, which relies on the fact that there is a linear relationship between the clock frequency at which a microprocessor operates and the power dissipation of the microprocessor. Dual-mode mobile processor technology allows a mobile PC user to operate the processor at a high performance, high frequency mode when the system is plugged into a wall outlet and automatically switch the processor to a lower performance, lower frequency mode when the system is running solely on a battery. In order to manipulate processor clock frequency in computer systems, methods and circuits are being developed to provide greater control over clock signals.

Some processor designs have included a feature for changing the operating clock frequency. The bus ratio is the multiplier factor used to multiply the frequency of the external clock signal for use within the processor. In one example, the processor clock frequency ratio may be adjusted by setting the state of four pins on the front side of the processor bus. When the processor resets, the new bus ratio is latched into the processor clock circuitry.

Present designs also use external pull-up or pull-down resistors in conjunction with a multiplexer circuit to apply bus ratio setting during a reset sequence. A number of pull-up and pull-down components and circuitry have to be designed into the board assembly in order to enable all desired bus ratio settings. If a bus ratio is controlled through four signals, at least nine components (four pull-ups, four pull-downs, and a multiplexer) have to be included in the board design in order to provide two bus ratio settings. Furthermore, the only way the bus ratio setting can be changed after the system is built is to open up the computer and physically alter the motherboard. Hence, another design problem entails determining what bus ratio settings to maintain on the motherboard.

FIG. 1 is block diagram of a prior art circuit 100 for changing bus ratios. In this example circuit, four control signals 165 are used to control the bus ratio setting for processor 160. The control signals 165 are outputs of a multiplexer 155. Multiplexer 155 switches different input signals to its output pins based on the setting on a select signal 140. Two settings 110, 120 of bus ratios and control lines from the chipset are input signals to the multiplexer 155 here. The bus ratio settings 110, 120 are determined by connecting jumpers between input pins to the multiplexer 155 and pull-up resistors 130 and pull-down 135 jumpers. The bus ratio settings are made when system is assembled. In order for a user to modify the bus ratio settings, a user would have to open up the computer and physically adjust the pull-down 135 connections.

SUMMARY OF THE INVENTION

A method for incorporating bus ratio strap options in chipset logic is described. The method of one embodiment first fabricates a register and multiplexer in chipset logic. The register is programmed with a bus ratio setting. A bus ratio setting is selected to be the output from the multiplexer. The selected bus ratio setting is driven out from the multiplexer to output pins.

Other features and advantages of the present invention will be apparent from the accompanying drawings and from the detailed description that follows.

BRIEF DESCRIPTION OF THE DRAWINGS

The present invention is illustrated by way of example and not limitations in the figures of the accompanying drawings in which like references indicate similar elements, and in which.

DETAILED DESCRIPTION

A method of incorporating bus ratio strap options in chipset logic is disclosed. Although the following embodiments are described with reference to Intel processor-based mobile personal computers, other embodiments are applicable to other types of systems and circuits that use clock signals. The same techniques and teachings of these and alternative embodiments can easily be applied to other types of circuits having switchable bus ratios.

Advancements in processor designs and semiconductor manufacturing technology allow future processors to deliver greater performance and consume less power. One technology offers mobile users two performance modes: Maximum Performance mode and Battery Optimized mode. Maximum Performance mode takes advantage of the additional power provided by an alternating current (AC) power source to provide a new level of mobile PC performance, while Battery Optimized mode provides optimal performance while running on battery. This dual-mode capability also allows a system to automatically change the processor voltage and frequency when a user switches power from an AC supply or battery power. By reducing the voltage and frequency, power consumption may drop significantly with a relatively minor reduction in processor speed. Hence robust performance may still be achieved without sacrificing battery life.

A method and apparatus are described for changing a processor clock frequency with bus ratio strap options in chipset logic. This ability may be particularly advantageous in mobile systems because a computer system may operate at a number of discrete performance levels. When the processor clock frequency is changed, system performance may be switched from one level to another. Enhancements may facilitate the use of higher performance processors in mobile computing systems. For instance, a mobile computer system may operate in a high power, higher performance state when the system is docked in a fixture that could supply large amounts of power and external cooling. The same mobile system could enter a lower performance state that requires less power and cooling if the system is operating on battery power.

The present enhancement allows computer system designers to build computers that support multiple performance modes and reap savings on components and board layout. Users can alter bus ratio settings without a performing a physical change to the motherboard each time. In addition, the bus ratio circuitry can share signal pins on the chipset and be accessed via the System Management Bus (SMBus). By incorporating the bus ratio strap options into chipset logic, floor space is also saved on the motherboard.

Figure 1:
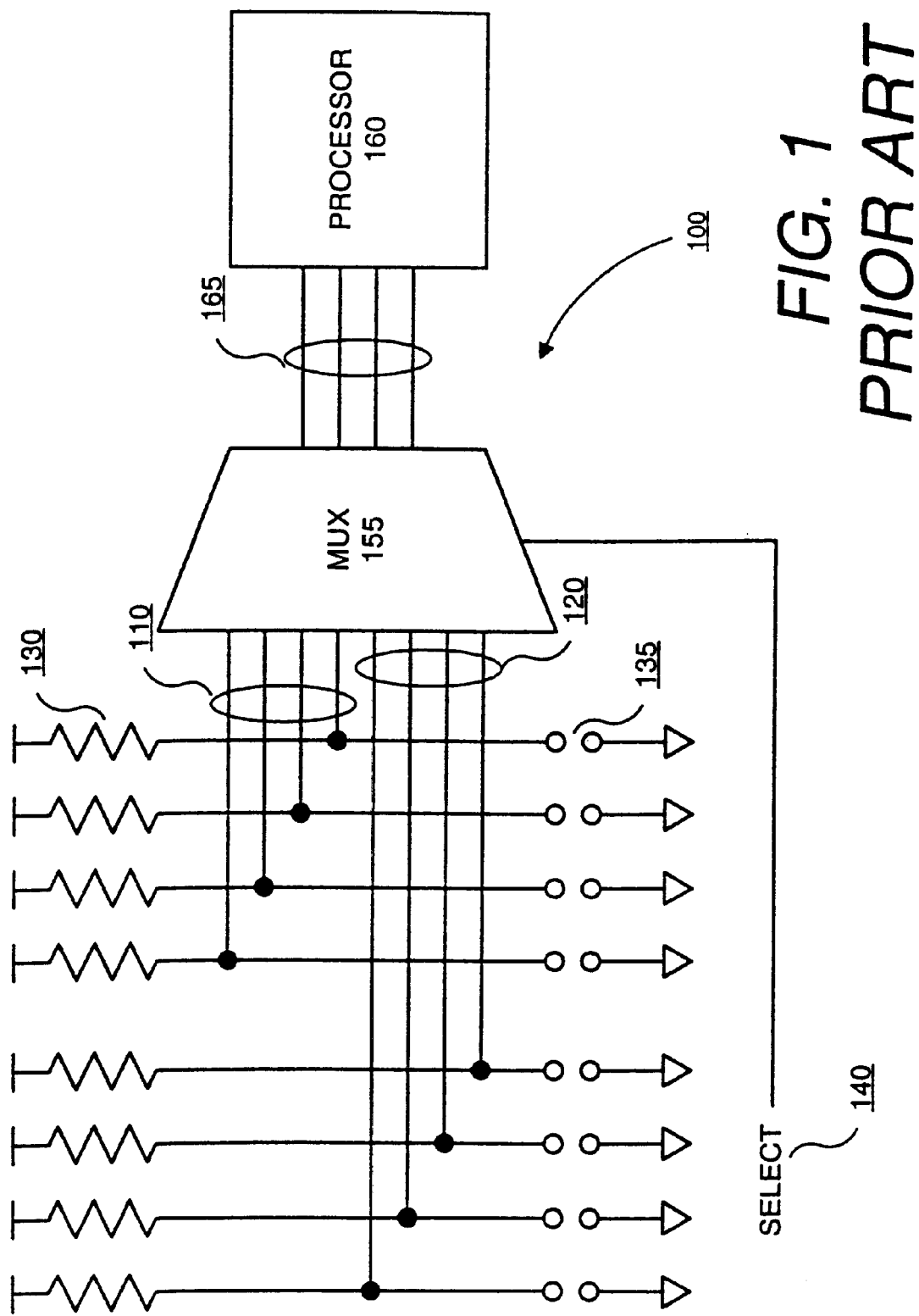
FIG. 1 is a block diagram of a prior art circuit for changing bus ratios.
Figure 2:
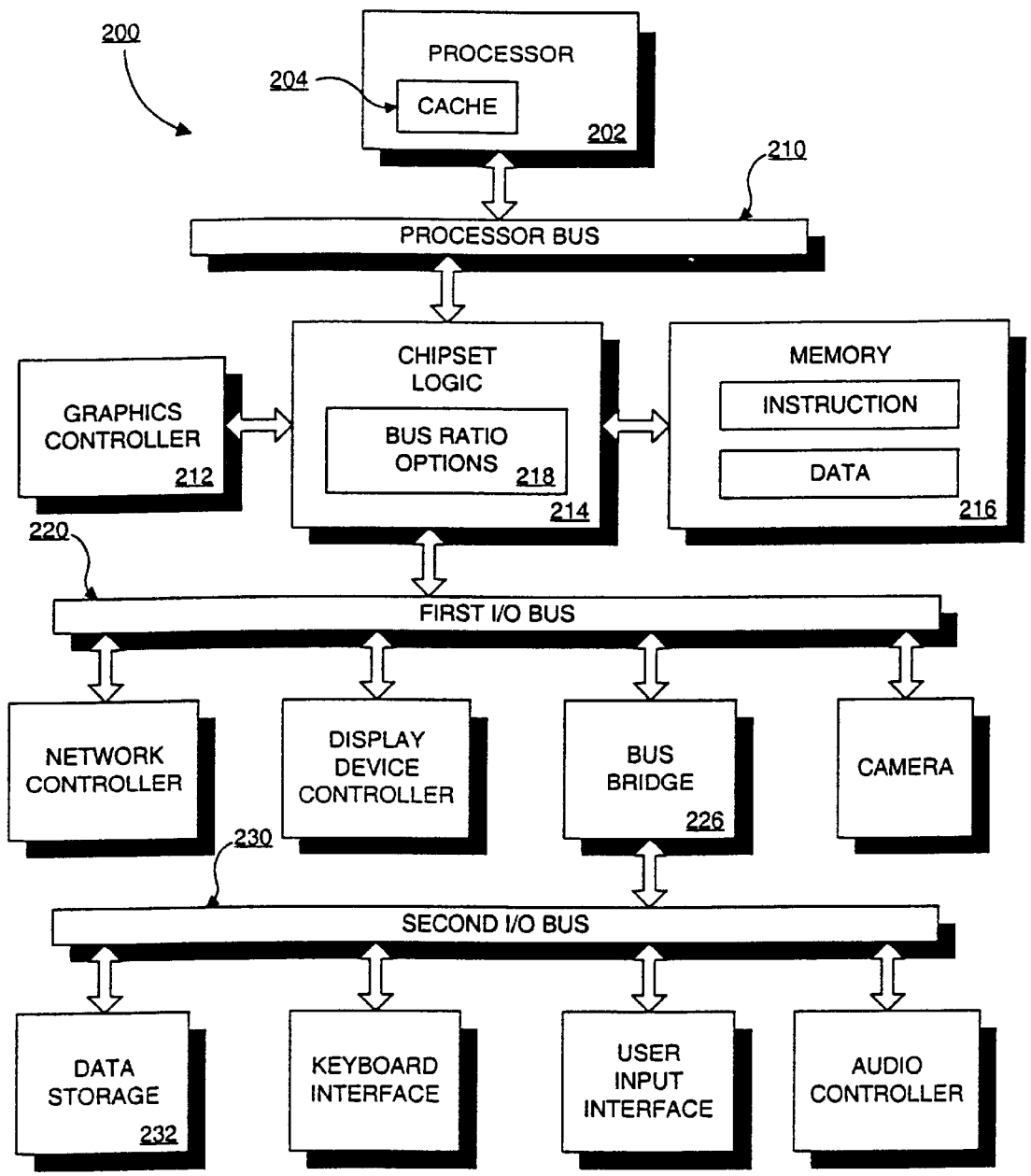
FIG. 2 is a block diagram of a computer system that includes the incorporation of bus ratio strap options in chipset logic.

Referring now to FIG. 2, there is a block diagram of a computer system 200 that includes the incorporation of bus ratio strap options in chipset logic. Sample system 200 may incorporate bus ratio strap options in chipset logic, in accordance with the present invention, such as in the embodiment described herein. In alternative embodiments, system 200 may comprise of applications such as system on a chip, digital signal processing system, or cellular phones. Sample system 200 is representative of processing systems based on the PENTIUM®, PENTIUM® Pro, PENTIUM® II, PENTIUM® III microprocessors available from Intel Corporation of Santa Clara, Calif., although other systems (including PCs having other microprocessors, engineering workstations, set-top boxes and the like) may also be used. In one embodiment, sample system 200 may be executing a version of the WINDOWS™ operating system available from Microsoft Corporation of Redmond, Wash., although other operating systems and graphical user interfaces, for example, may also be used. Thus, the present invention is not limited to any specific combination of hardware circuitry and software.

FIG. 2 is a block diagram of a system 200 of one embodiment. The computer system 200 includes a processor 202 that processes data signals. The processor 202 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 2 shows an example of an embodiment of the present invention implemented as a single processor system 200. However, it is understood that embodiments of the present invention may alternatively be implemented as systems having multiple processors. Processor 202 may be coupled to a processor bus 210 that transmits data signals between processor 202 and other components in the system 200. The elements of system 200 perform their conventional functions well-known in the art.

System 200 includes a memory 216. Memory 216 may be a dynamic random access memory (DRAM) device, a static random access memory (SRAM) device, or other memory device. Memory 216 may store instructions and/or data represented by data signals that may be executed by processor 202. A cache memory 204 may reside inside processor 202 that stores data signals stored in memory 216. Alternatively, in another embodiment, the cache memory may reside external to the processor.

In this embodiment, chipset logic 214 is coupled to the processor bus 210 and memory 216. Bus ratio strap options 218 resides in chipset logic 214. Chipset logic 214 in system 200 provides the function of a bridge/memory controller. Chipset logic 214 directs data signals between processor 202, memory 216, and other components in the system 200 and bridges the data signals between processor bus 210, memory 216, and a first input/output (I/O) bus 220. In some embodiments, the bridge/memory controller provides a graphics port for coupling to a graphics controller 212. In one embodiment, the bridge/memory controller 214 may be referred to as the North Bridge portion of the chipset logic.

First I/O bus 220 may comprise a single bus or a combination of multiple buses. First I/O bus 220 provides communication links between components in system 200. The first I/O bus 220 may be a Peripheral Component Interconnect (PCI) local bus. A network controller 222 may be coupled to the first I/O bus 220. A second I/O bus 230 may comprise a single bus or a combination of multiple buses. The second I/O bus 230 provides communication links between components in system 200. The second I/O bus 230 may be an Industry Standard Architecture (ISA) bus. A data storage device 232 may be coupled to second I/O bus 230. The data storage device 232 may comprise a hard disk drive, a floppy disk drive, a CD-ROM device, a flash memory device, or other mass storage device. A bus bridge 226 couples first I/O bus 220 to second I/O bus 230. The bus bridge 226 operates to buffer and bridge data signals between the first I/O bus 220 and the second I/O bus 230. In one embodiment, the bus bridge 226 may be referred to as the South Bridge portion of the chipset logic.

Currently, certain processors can function at different clock speeds in the same computer system. This capability is achieved by changing bus ratio settings. Typically, the internal clock generator on a processor takes an external bus clock and multiplies it by a certain ratio. The system clock is set and multiplied by different factors depending on the mode in which the processor is operating. In many instances, the processor speed and mode is determined during processor reset. Some processor designs provide users with an option to set the internal clock ratio. For example, the Pentium® II processor allows the clock ratio to be modified by manipulating a number of signal input pins during the processor reset sequence. The bus ratio may set in the processor in a number of ways. One method uses fuses to store the bus ratio. But if the fuses are not set, the bus ratio may be defined by the level of four external pins during the reset sequence.

A methodology to change the bus ratio settings using logic incorporated in the supporting chipset logic is described. Chipset logic in PCs has traditionally been divided into a North Bridge and a South Bridge. The North and South Bridge components talk over the PCI bus. The North Bridge may comprise of a PCI master and memory control logic. The South Bridge may comprises of a PCI to ISA bridge, basic system control logic, and system I/O logic. In another embodiment, the chipset solution may comprise of a single component that integrates both the North and South Bridge portions of existing chipsets. By using an integrated chipset, mobile PC manufacturers may be able to reduce both component costs and the number of components, ultimately resulting in lower cost mobile PCs and mini-notebook platforms.

In one embodiment, a storage location such as a programmable register is used to load new clock frequency information into the clock generator circuit of the processor. Hardware designers can incorporate a number of resistors and multiplexer logic into the chipset. The bus ratio register is incorporated into a chipset component that generates control signals during a processor reset sequence. This register may be addressed via the SMBus or by commands from the processor itself. For one embodiment, bus ratio data is written to this register and the system is then placed in a suspended or deep sleep state via the SMBus. When the system exits this state, the bus ratio settings are applied from the register to the processor's bus ratio signal pins during the processor reset. As a result, the processor will operate at the newly set internal clock frequency when the processor resumes a normal operating state.

Figure 3:
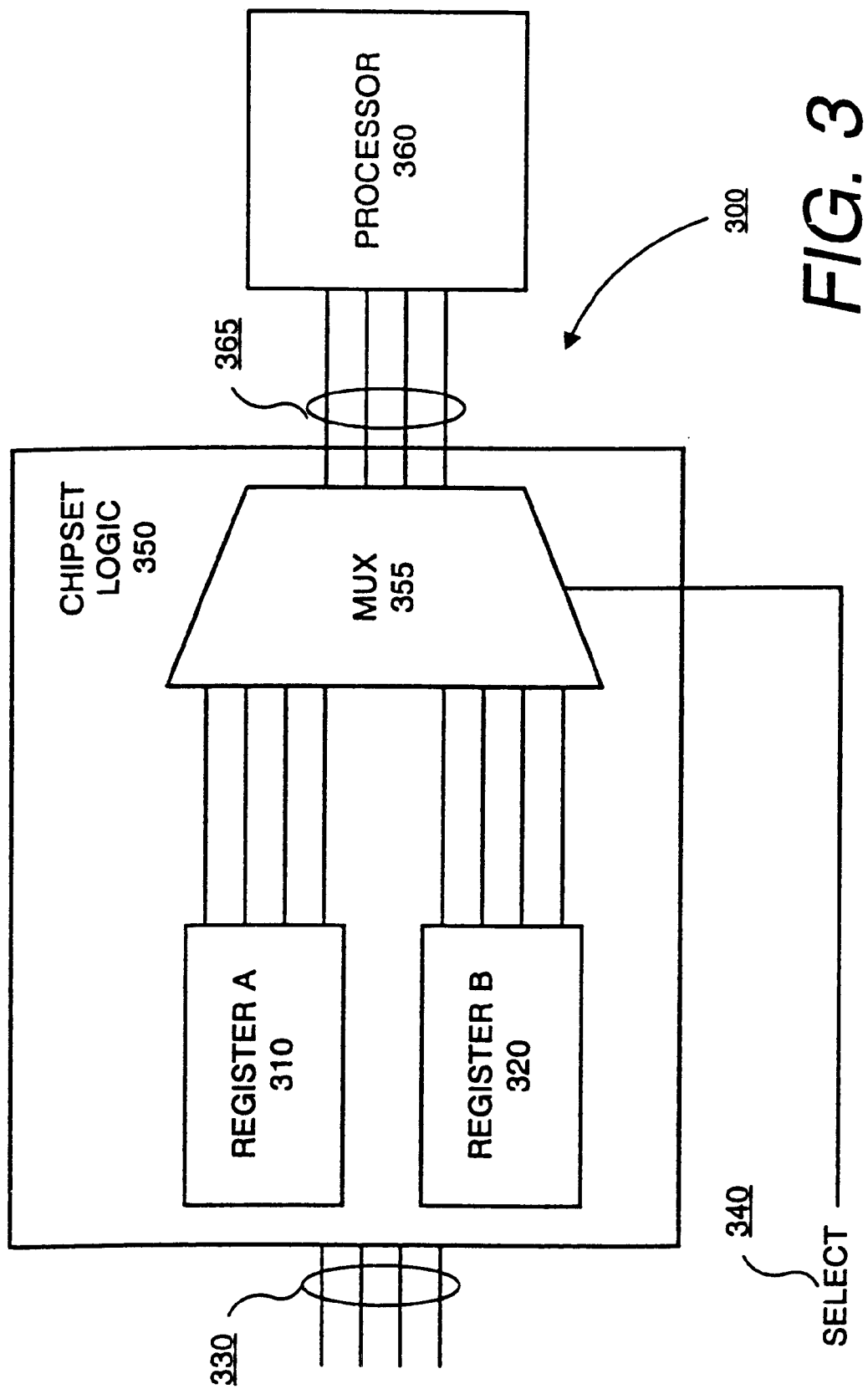
FIG. 3 is a block diagram of one embodiment of a circuit incorporating bus ratio strap options in chipset logic.

FIG. 3 is block diagram of one embodiment of a circuit 300 incorporating bus ratio strap options in chipset logic 350. The chipset logic of another embodiment may comprise of separate components such as a North and South Bridge. Furthermore, the programmable registers may be incorporated into the internal logic on either the North or South Bridge. In this embodiment, four control signals (RATIO [3:0]) 365 are used to control the bus ratio setting for processor 360. The control signals 365 are outputs of chipset logic 350. Another embodiment uses signals generated from the South Bridge component such as INTR, NMI, A20M#, and IGNEE# to control the bus ratio. The signals may be dedicated to setting the bus ratio or dual usage signals.

The control signals 365 and external clock signal provided to the processor 360 may be used to drive the processor's internal clock generator circuitry in one embodiment. This clock generator circuitry usually comprises a conventional phase-locked loop (PLL) circuit. As an alternative to a PLL, a delay line loop or other functionally equivalent circuit may be used to generate the internal clock signal of the processor. The clock generator circuitry of one embodiment takes the bus ratio and use the value as a multiplier in generating internal clock signals.

Two registers 310, 320 and a multiplexer 355 are incorporated within the chipset logic 350 of one embodiment to facilitate changing bus ratio options. Multiplexer 355 switches different input signals from its inputs pins to its output pins based on a select signal 340. One implementation comprises of two 4-bit registers, one defining a high performance setting and the other defining a low performance setting. The specific example here provides two bus ratio settings for the processor. The two programmable registers 310, 320 each store a bus ratio setting. The outputs of the registers 310, 320 are coupled to the inputs of multiplexer 355. The bus ratio settings could be programmed into the registers 310, 320 via external inputs 330. In FIG. 3, four external control signals 330 are routed into the chipset component 350 and coupled to the bus ratio registers 310, 320.

In one embodiment, the registers 310, 320 may be set by internal chipset logic. In another embodiment, the SMBus may have system control upon system power-up. The SMBus normally includes a system controller that is programmed with a hard-coded program to configure system setting. The system management controller may load the system settings from the Basic Input/Output System (BIOS) or Read Only Memory (ROM) upon power-up and feed the data to the chipset. The bus ratio values are then loaded into a register that defines the bus ratio setting. The multiplexer decides whether to write out a high performance setting or a low performance setting depending on its select signal.

Another embodiment may provide for coupling inputs 330 to the processor control signals 365. In this case, the inputs 330 may be connected to the multiplexer 355 as a set of inputs and the select signal 340 could couple the inputs 330 to the processor control pins 365. This method would also allow the processor to write out a new desired bus ratio setting and then cause a reset for itself. When the processor comes back up after the reset, the multiplexer in the chipset would apply the proper bus ratio to the processor over the pins and the processor would come up in the new bus ratio setting. Hence, a user may be able to modify the bus ratio settings with a register operation, instead of having to opening up the computer system.

Figures 4A, 4B:
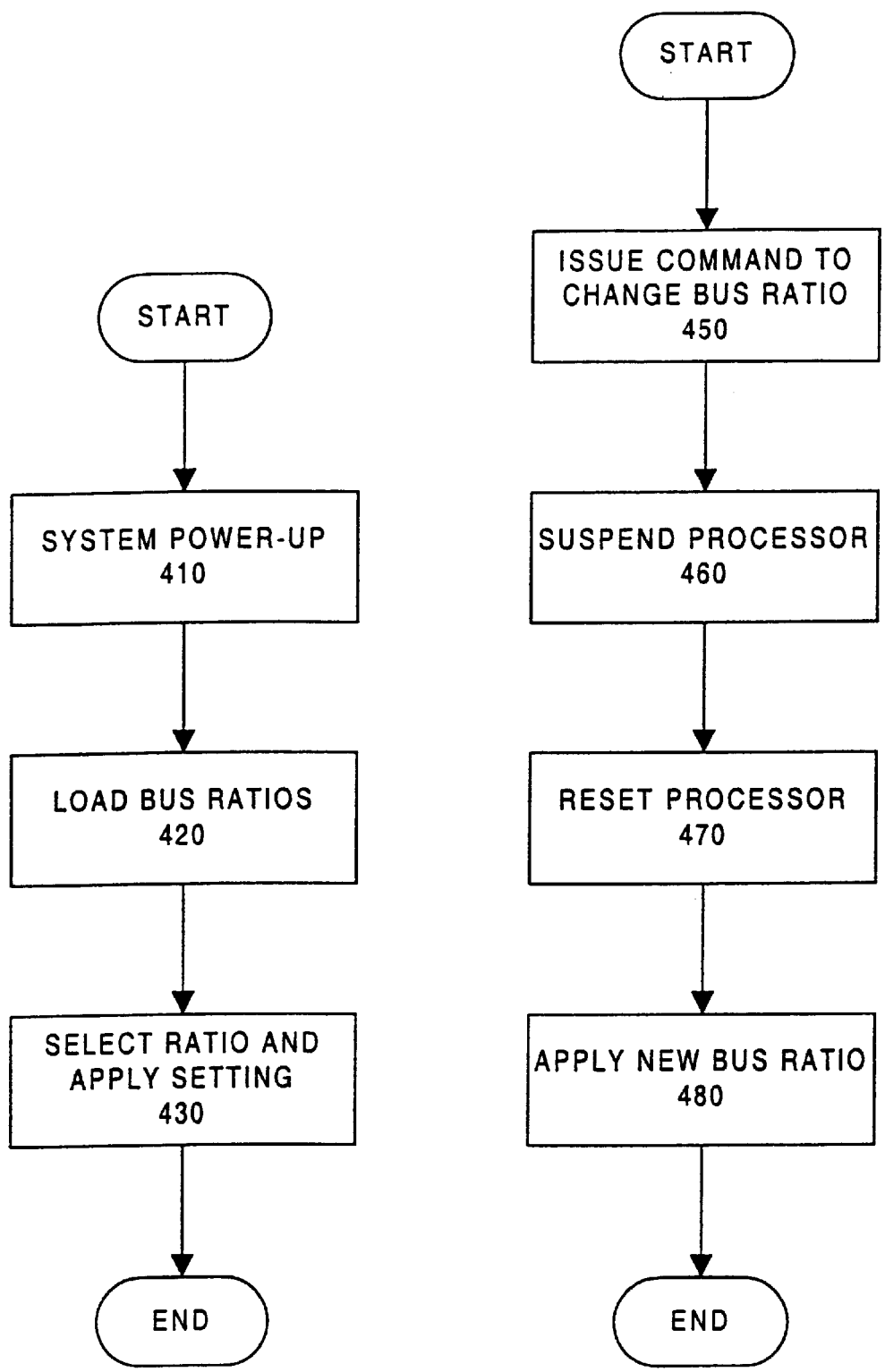
FIG. 4a is a flow diagram of a boot sequence for one embodiment of a system utilizing a method for incorporating bus ratio strap options in chipset logic.
FIG. 4b is a flow diagram showing a bus ratio change sequence.

FIGS. 4a and 4b illustrate the processor reset sequences of one embodiment. FIG. 4a is a flow diagram of a boot sequence for one embodiment of a system utilizing a method for incorporating bus ratio strap options in chipset logic. The computer system starts to power-up or cold boot at step 410. Then at step 420, the BIOS or system management control loads the bus ratio registers in the chipset with the proper ratio settings for the processor installed in the system. At step 430, the chipset logic then selects one of the ratio settings and the selection is applied to the processor during processor clock reset. The default bus ratio selection of one embodiment is a low performance mode.

During normal operating state, the processor performs usual tasks such as executing program instructions, performing calculations, and processing data. However, the user may decide to change the system to a higher performance state while the system is up and running in a normal operating mode. FIG. 4b is a flow diagram showing a bus ratio change sequence. The processor first writes out commands to the chipset logic to request a higher performance mode at step 450. The system is then placed in a suspend/sleep state at step 460. In one embodiment, the sleep state will cause the hardware to perform the following steps: stop system clocks, place system memory into a self or suspend refresh state, power off the processor and cache subsystem. When the system is in a sleep state, the memory cache may be flushed and the processor/system cache context lost. However, the context of the core logic and memory is maintained in one embodiment. When the processor is in a deep power-down or sleep mode, the processor operating clock frequency and clock ratio information may be changed. The processor returns to normal operating state from deep power-down upon detection of a wakeup event such as receiving any one of a number of interrupt or reset signals. For example, commonly known signals such as INTR, NMI, SMI#, RESET, or INIT may cause the processor to transition back to a normal operating state. As the system comes out of suspend or sleep, the chipset logic recognizes the system resume and resets the processor at step 470. The chipset also recognizes that the processor has requested that a higher bus ratio be used. While the processor is in its reset sequence, the bus ratio register in the chipset drives the new bus ratio setting to the processor at step 480. As the processor returns to a normal operating state, the processor should be functioning at a higher performance state. Hence the system may alternate between high performance and low performance modes during operation.

Figure 5:
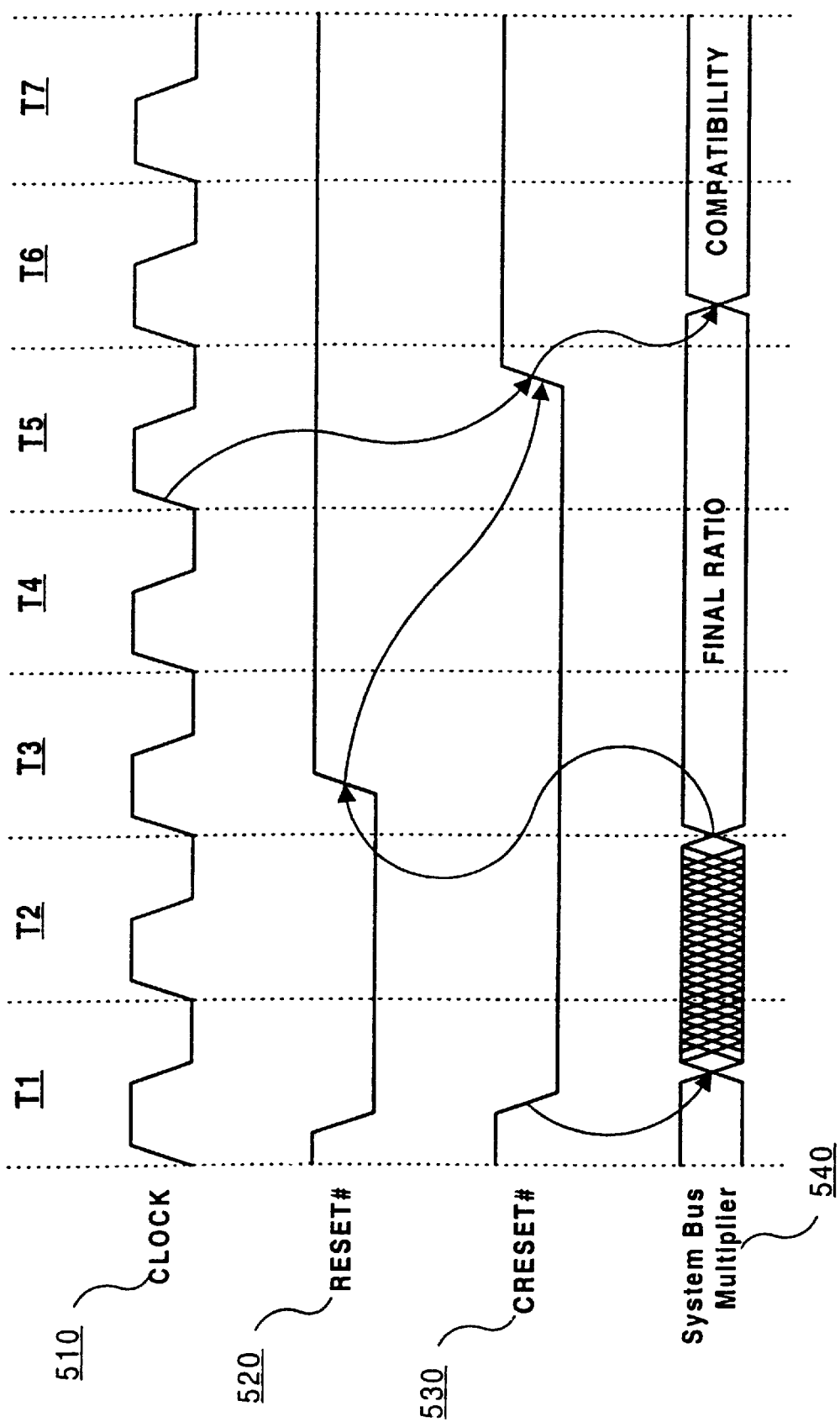
FIG. 5 is a timing diagram showing the relationship between reset signals and bus ratio data for one embodiment.

FIG. 5 is a timing diagram showing the relationship between reset signals and bus ratio data for one embodiment. A system clock signal 510 is coupled to the chipset and processor. System Bus Multiplier 540 is the bus ratio option setting coupled to the processor. The system RESET# signal 520 is an active low signal. Similarly, CRESET# signal 530 is also an active low signal. In this embodiment, CRESET# 530 is directly related to RESET# 520. The CRESET# signal 530 is a delayed/latched version of the RESET# 520 signal. As shown in FIG. 5, CRESET# 530 mimics the RESET# 520 transition to high at time T3 two clock cycles later at time T5.

At time T1, a reset sequence is initiated in the system and the processor. As CRESET# 530 goes low, the system boots up and the SMBus loads the bus ratio settings into the chipset register. RESET# 520 goes high at time T3 and one set of bus setting at the multiplexer inputs is selected. The selected bus ratio setting is then driven out from the chipset to the processor. CRESET# 530 goes high at time T5 and the processor reads in the bus ratio. At time T6, the processor complies and utilizes the new bus ratio multiplier.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for incorporating bus ratio strap options in chipset logic comprising:

fabricating a register and a multiplexer in said chipset logic;

programming said register with a bus ratio setting through a register operation, said bus ratio setting communicated to said register via chipset logic input pins, said bus ratio setting provided from a user;

selecting said bus ratio setting; and driving said selected bus ratio setting out from said multiplexer to output pins.

2. The method of claim 1 further comprising resetting a processor.

3. A chipset comprising:

a bus master and a bus bridge;

a memory control logic coupled to said bus master;

a system control logic coupled to said memory control logic;

a register coupled to said bus master, said register programmable to store a bus ratio setting, said register further programmable with a user inputted bus ratio setting through a register operation wherein said user inputted bus ratio setting is received via chipset input pins; and a multiplexer coupled to said register, said multiplexer to apply a selected bus ratio setting to output pins.

4. The chipset of claim 3 wherein a select signal is coupled to said multiplexer, said select signal selecting one set of multiplexer inputs to be coupled to output of said multiplexer.

5. A method of changing a processor clock frequency comprising:

inputting a bus ratio value from a user with a register operation;

loading a register with said bus ratio value;

coupling said bus ratio value from said register to a multiplexer;

selecting a bus ratio setting to be output from said multiplexer;

driving said selected bus ratio setting to inputs on a processor; and resetting said processor.

6. The method of claim 5 further comprising locking said selected bus ratio setting into a clock generator circuit.

7. The method of claim 5 wherein said register is located within a chipset.

8. The method of claim 5 wherein said value is a bus ratio setting.

9. The method of claim 5 wherein said processor inputs are coupled to a clock generator circuit.

10. The method of claim 9 wherein said clock generator circuit multiples an external clock signal with said selected bus ratio setting to generate an internal clock signal.

11. An apparatus for changing a processor clock frequency comprising:

a processor;

a chipset coupled to said processor, said chipset having internal logic comprising a register to store a bus ratio setting and a multiplexer to apply said bus ratio setting to said processor, said chipset to receive a user inputted bus ratio setting through a register operation and to program said register with said user inputted bus ratio setting; and a system management controller coupled to said chipset through a system management bus.

12. The apparatus of claim 11 wherein said register is addressable on said system management bus.

13. The apparatus of claim 11 wherein said register is accessible through processor instructions.

14. The apparatus of claim 11 wherein said chipset comprises of a North Bridge and a South Bridge.

15. The apparatus of claim 11 wherein said chipset comprises of a memory controller hub.

16. The apparatus of claim 11 wherein said chipset has a system management bus interface.

17. The apparatus of claim 11 wherein said processor has a clock generator circuit to generate an internal clock signal for said processor.

18. The apparatus of claim 17 wherein clock frequency of said internal clock signal is based on multiplying an external clock signal with said bus ratio setting.

19. A digital processing system comprising:

a processor;

a main memory coupled to said processor;

a chipset coupled to said processor, said chipset having internal logic comprising two registers to store bus ratio settings and a multiplexer to apply a selected bus ratio setting to said processor, said chipset to receive a user inputted bus ratio setting through a register operation and to program one of said registers with said user inputted bus ratio setting; and a system management controller coupled to said chipset through a system management bus.

20. The digital processing system of claim 19 wherein said registers are addressable on said system management bus.

21. The digital processing system of claim 19 wherein said registers are programmed with bus ratio settings upon system power-up.

22. The digital processing system of claim 19 wherein said selected bus ratio setting is applied to clock generator circuit of said processor.

23. The digital processing system of claim 22 wherein said clock generator circuit uses said selected bus ratio setting to generate an internal processor clock signal.

24. The digital processing system of claim 19 wherein said chipset comprises a memory controller hub.

25. The digital processing system of claim 19 wherein said chipset comprises a North Bridge and a South Bridge.

26. The digital processing system of claim 19 wherein said chipset has a system management bus interface.

* * * * *